(12) United States Patent
Erdahl

(10) Patent No.: US 8,215,370 B2
(45) Date of Patent: Jul. 10, 2012

(54) TEMPORARY WINDOW REPLACEMENT APPARATUS AND METHODS OF USE

(76) Inventor: Chris Erdahl, Eagle, CO (US)

( * ) Notice: Subject to any disclaimer, the term of this patent is extended or adjusted under 35 U.S.C. 154(b) by 156 days.

(21) Appl. No.: 12/720,513

(22) Filed: Mar. 9, 2010

(65) Prior Publication Data

US 2011/0221225 A1    Sep. 15, 2011

(51) Int. Cl.
*B60J 11/08*    (2006.01)
(52) U.S. Cl. .................. 160/374; 160/372; 160/381
(58) Field of Classification Search .................. 160/354, 160/371, 377, 372, 374, 105, 370.21; 296/152, 296/107.07, 145; 403/109.1, 109
See application file for complete search history.

(56) References Cited

U.S. PATENT DOCUMENTS

| | | | | |
|---|---|---|---|---|
| 988,554 A * | 4/1911 | Donnell et al. | .............. | 38/102.8 |
| 2,600,192 A * | 6/1952 | Bell | .............. | 160/372 |
| 2,702,596 A * | 2/1955 | Morrow | .............. | 160/354 |
| 3,411,562 A | 11/1968 | Garrett | | |
| 4,285,383 A * | 8/1981 | Steenburgh | .............. | 160/374 |
| 4,653,562 A | 3/1987 | Moss et al. | | |
| 4,719,736 A | 1/1988 | Aho et al. | | |
| 4,889,754 A | 12/1989 | Vargas | | |
| 5,653,497 A | 8/1997 | Campfield et al. | | |
| 5,857,730 A | 1/1999 | Korpi et al. | | |
| 5,879,044 A | 3/1999 | Stufano | | |
| 5,937,596 A * | 8/1999 | Leeuwenburgh et al. | ...... | 52/202 |
| 5,957,524 A | 9/1999 | Feder | | |
| 6,352,299 B1 | 3/2002 | Ames et al. | | |
| 6,869,127 B2 | 3/2005 | Dohle | | |
| 6,979,045 B1 | 12/2005 | Evans | | |
| 7,090,283 B2 | 8/2006 | Farley | | |
| 7,452,025 B2 | 11/2008 | Grindle | | |
| 2007/0181272 A1 | 8/2007 | Lewis | | |
| 2007/0209749 A1 | 9/2007 | Berndt et al. | | |
| 2011/0221225 A1 * | 9/2011 | Erdahl | .............. | 296/96.21 |

* cited by examiner

Primary Examiner — Blair M. Johnson
(74) Attorney, Agent, or Firm — Leyendecker & Lemire, LLC; Kurt Leyendecker

(57) ABSTRACT

Devices and methods for temporarily replacing a window are disclosed herein. An exemplary temporary window replacement apparatus includes a plurality of angled frame members, a plurality of elongated frame members, and a plastic film. Typically, at least one of the angled frame members can change angles within a given plane. Additionally, at least one of the elongated frame members typically can adjusted lengthwise along a longitudinal axis to connect with the ends of two angled frame members. The end of each angled frame member typically can be connected and removed from the end of each elongated frame member. Moreover, some of the frame members have attached stability flange to aid in securing the temporary window apparatus to an automobile window frame. Methods of temporarily replacing a window include constructing a temporary window frame with a heat-shrinkable plastic film and then applying heat thereto.

20 Claims, 8 Drawing Sheets

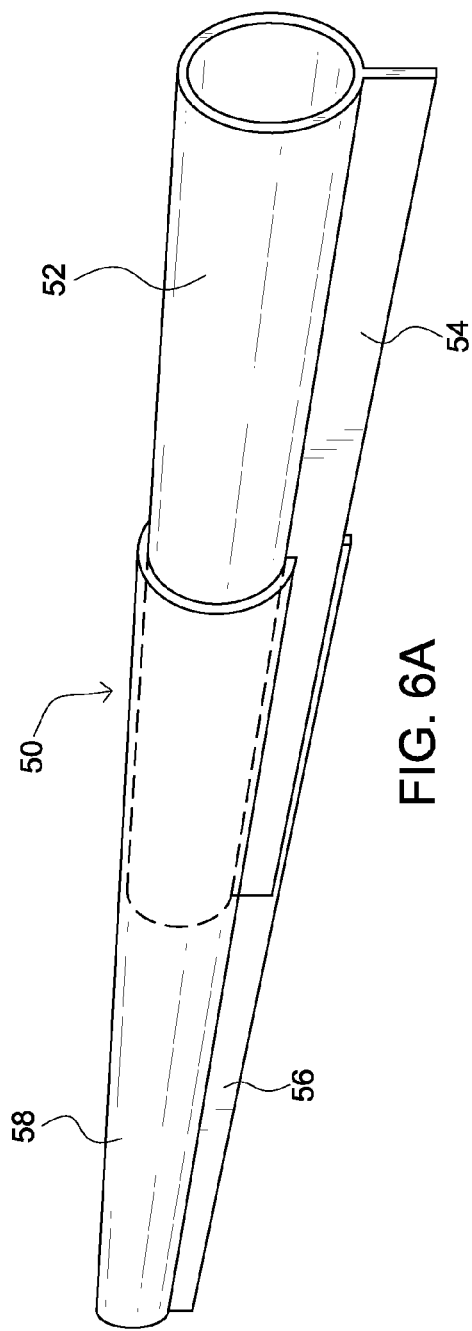
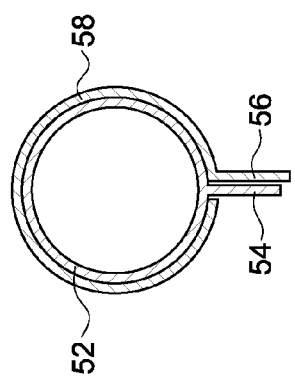
FIG. 6A
FIG. 6B

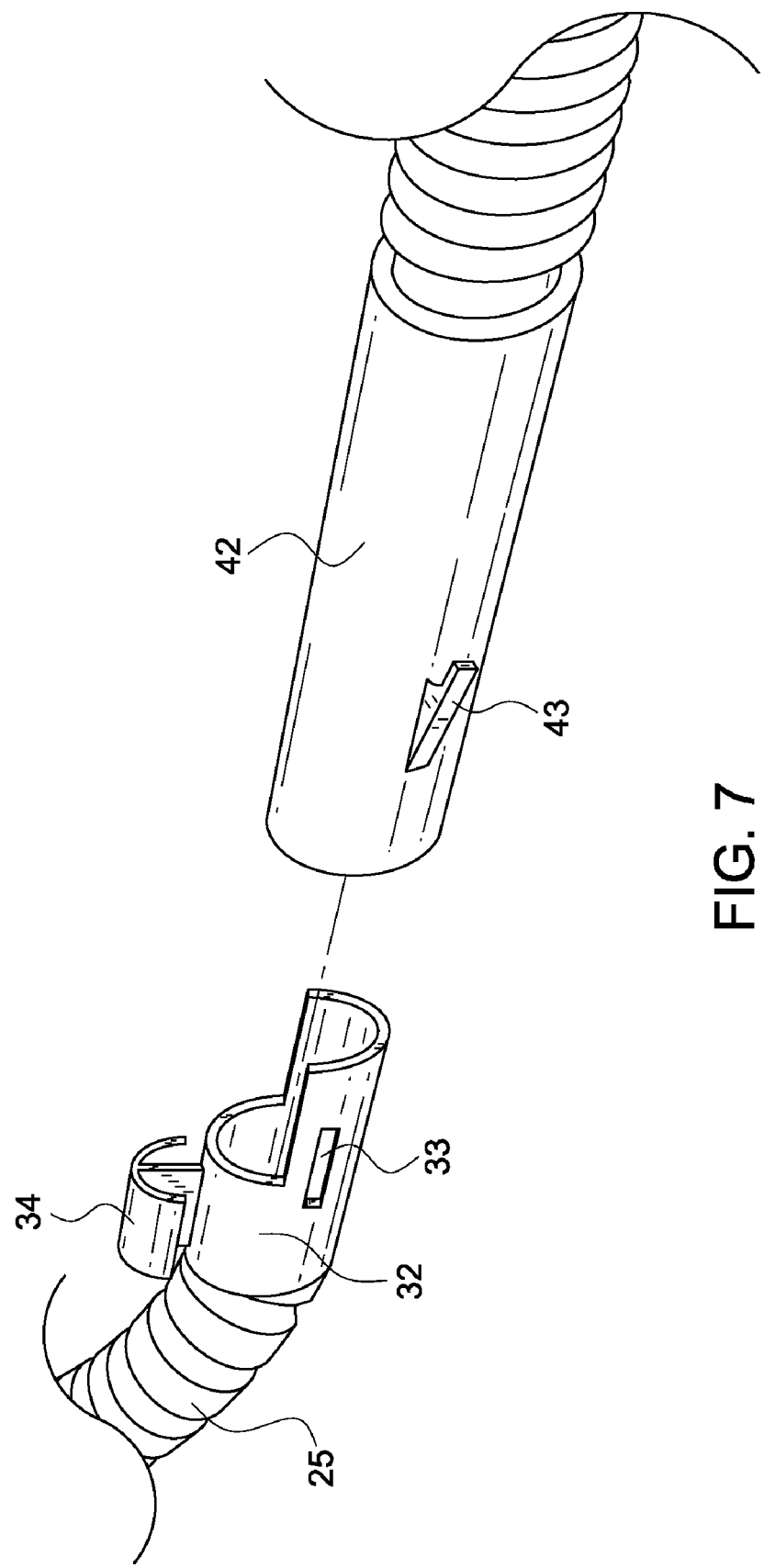

TEMPORARY WINDOW REPLACEMENT APPARATUS AND METHODS OF USE

FIELD OF THE INVENTION

The present invention pertains to temporary windows. More particularly, the present invention pertains to temporary windows for automobiles and other vehicles.

BACKGROUND

Windows on automobiles can crack or break for a variety of reasons. Often foreign objects, such as rocks, will contact the window at high speeds causing the window to chip or shatter. A window when substantially cracked will typically require replacement for safety purposes. Other times windows will have been broken by a person vandalizing or attempting to steal objects from within the automobile. In some instances, the owner of the automobile may have to or inadvertently break his or her own window by attempting to gain entry into the automobile.

Many people whose automobile windows have been broken haphazardly cover the window opening with cardboard. Additionally, an adhesive such as duct tape is usually applied to the cardboard and a portion of the automobile surrounding the window opening. Such a solution is not very practical, particularly in wet and cold weather. Also, depending on the location of the window replaced with cardboard, the visibility of the driver may be significantly impaired. Moreover, the adhesive can often damage the portion of the automobile surrounding the window opening such as the weather stripping, plastic frame portion, and the painted metal frame portion. Other known prior art similarly fails in providing an adequate solution to temporarily replacing a broken window.

Further, when an automobile window is cracked or broken, it often takes a substantial amount of time before the window can be replaced because the person may be extremely busy and/or unable to find a repair shop to perform the replacement. Heretofore, a temporary window replacement solution that enables a person to temporarily replace a broken window while providing safe visibility for the driver and protection from the elements remains a long felt need of many persons who've unfortunately have their automobile windows broken.

BRIEF DESCRIPTION OF THE DRAWINGS

FIG. 6A is a perspective view of a variation of an elongated frame member according to an embodiment.

FIG. 6B is a cross-sectional view of a variation of an elongated frame member according to an embodiment.

FIG. 7 is a perspective view of an end of an elongated frame member and an end of an angled frame member adapted to couple with each other according to an embodiment.

DETAILED DESCRIPTION

Figure 1:
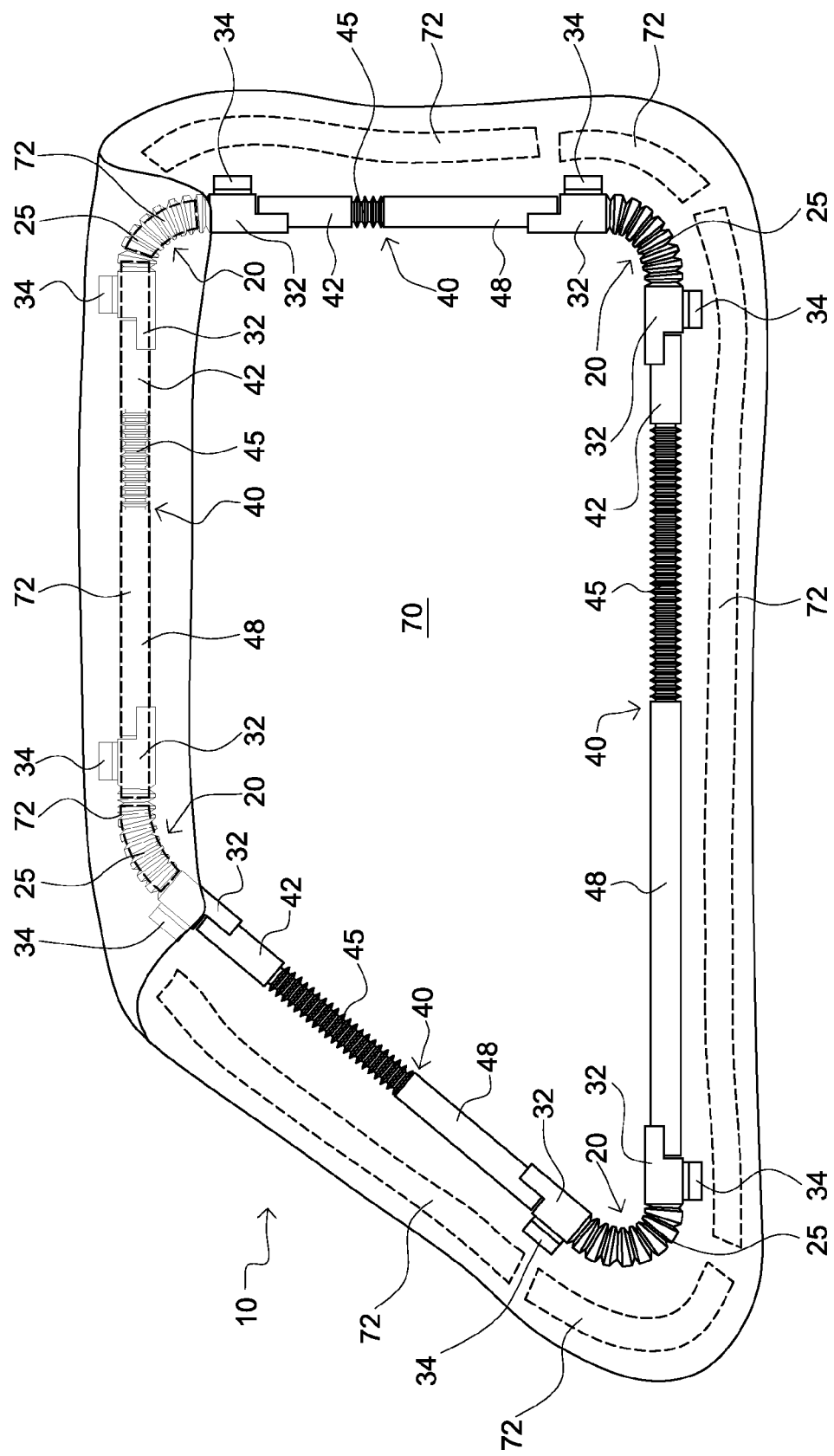
FIG. 1 is a front plan view a temporary window replacement apparatus according to an embodiment.

Embodiments of the present invention comprise a temporary window replacement apparatus and methods of temporarily replacing a window. The temporary window replacement apparatus is generally designed for use on automobiles or other vehicles. However, embodiments of the temporary window replacement apparatus may be utilized to replace a broken window in other situations, particularly when the frame of the broken window includes a channel or slots around the inner circumference of the window frame.

A typical embodiment of the temporary window replacement apparatus comprises a plurality of members used to frame and cover a window opening, and a plastic film. The plurality of members typically includes elongated frame members and angled frame members. The elongated frame members are expandable longitudinally and adapted to interlock with the angled frame members. The angled frame members typically have one or more securing flanges attached thereto, the security flanges enable the angled frame members to be inserted and secured into channels or slots around the inner circumference typical of automobile window frames. The plastic film can be comprised of a variety of polymers of various thicknesses. Additionally, the plastic film may be clear or tinted.

A method of temporarily replacing a window typically involves removing the remaining glass and clearing the channels of the window frame, placing a plastic film or sheet over the window opening, coupling a plurality of angled frame members to the window frame whereby the plastic film remains between the angled frame members and channels of the window frame, coupling a plurality of elongated frame members to end sections of the angled frame members, coupling the plastic film to the angled members and the elongated side members, and applying heat to the plastic film.

Benefits of at least some embodiments of the temporary window replacement apparatus and methods include providing a temporary window that is weather resistant, looks like it could be a permanent window from a distance, and is able to used for a substantial amount of time until the user is able to replace the window permanently.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning: either or both.

References in the specification to "one embodiment", "an embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

The term "removable," "removably coupled," "readily removable," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

Directional and/or relationary terms such as, but not limited to, left, right, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" and "generally" as used herein unless otherwise indicated mean a margin of +−20%. Also, as applicable, the term "substantially" as used herein unless otherwise indicated means a margin of +−10%. Concerning angular measurements, "about" or "generally" refer to +−10 degrees and "substantially" refers to +−5.0 degrees unless otherwise indicated. It is to be appreciated that not all uses of the above terms are quantifiable such that the referenced ranges can be applied.

The term "stability flange" as used in this specification and the appended claims refers generally to any flange or similar structure coupled to a member that may be aid in stabilizing the member for which it is attached. The flange or similar structure is typically inserted wholly or partially within a channel, groove, or similar cavity of a structure when the member is coupled to the structure.

An Embodiment of a Temporary Window Replacement Apparatus

FIG. 1 is an illustration of a temporary window replacement apparatus 10 according to an embodiment. The temporary window replacement apparatus 10 typically comprises a plurality of angled frame members 20, a plurality of elongated frame members 40, and a plastic film 70. Each of the angled frame members 20 typically comprises two end sections 32 and a flexible section 25. Moreover, at least one end section 32, but typically both, includes a stability flange 34. Each of the elongated frame members 40 typically comprises a first frame section and a second frame section 48. The first frame section of the elongated frame member 40 typically includes an end portion 42 and a rigid bellowed arrangement portion 45.

The plastic film 70 typically includes one or more adhesive portions 72. The one or more adhesive portions 72 are adapted to be coupled to the angled frame members and/or the elongated frame members. In one implementation, the one or more adhesive portions 72 extend as a single adhesive strip around the entire circumference of the plastic film 70. Moreover, the one or more adhesive portions 72 can be double-sided tape, an adhesive film or paste, pressure sensitive adhesive, or any other suitable adhesive compound, material, or combination that enables the plastic film to remain semi-permanently coupled to a surface the angled frame members 20 and the elongated frame members 40. The one or more adhesive portions 72 may also be placed on to the plastic film 70 after it has been cut or trimmed to a suitable shape for the window which is to be replaced. Alternatively, in some implementations, the one or more adhesive portions 72 may be applied directly to the various frame members and then coupled to the plastic film 70.

As can be seen from FIG. 1, the plastic film 70 is typically larger than a frame assembly comprising the plurality of angled frame members 20 and elongated frame members 40 coupled together. The plastic film 70 can then be wrapped generally around the frame assembly and then be secured by coupling the one or more adhesive portions 72 to the frame assembly. The one or more adhesive portions 72 can then be attached to a surface of a portion of the frame assembly facing the inside of an automobile, for instance. However, other implementations are contemplated whereby the plastic film 70 is coupled to the frame assembly without wrapping the plastic film around the entirety of the frame assembly and the one or more adhesive portions 72 would simply be attached to the frame assembly on a portion facing the outside of the automobile.

The plastic film 70 is typically a relatively thick transparent film of flexible polymeric material. In some implementations, the plastic film 70 can be comprised of a variety of materials such as, but not limited to, polyethylene terephthalate, polystyrene, and co-polymers. The thickness of the plastic film 70 can vary substantially depending on factors such as climate and placement of the temporary window replacement apparatus 10. However, a thickness of approximately 3 to 6 mils for the plastic film 70 is typical in embodiments. Moreover, while the plastic film 70 is typically transparent, some implementations exist wherein the plastic film 70 is tinted. Various shades and colors can comprise the tinting applied to the plastic film 70 to match that of the other windows in the vehicle.

Important to many embodiments, the plastic film 70 is adapted to shrink upon application of heat to a surface thereof. The heat-shrinking characteristics of the plastic film 70 used in many embodiments of the temporary window replacement apparatus 10 are typical to those used in winterizing windows in a home. However, any suitable plastic film or sheet with heat-shrinking characteristics will suffice. When the plastic film 70 is a heat-shrinkable plastic film, as will typically but not necessarily be the case, it can tightened into place by applying hot air to the surface of the plastic film (such as with a hair dryer).

Figure 2:
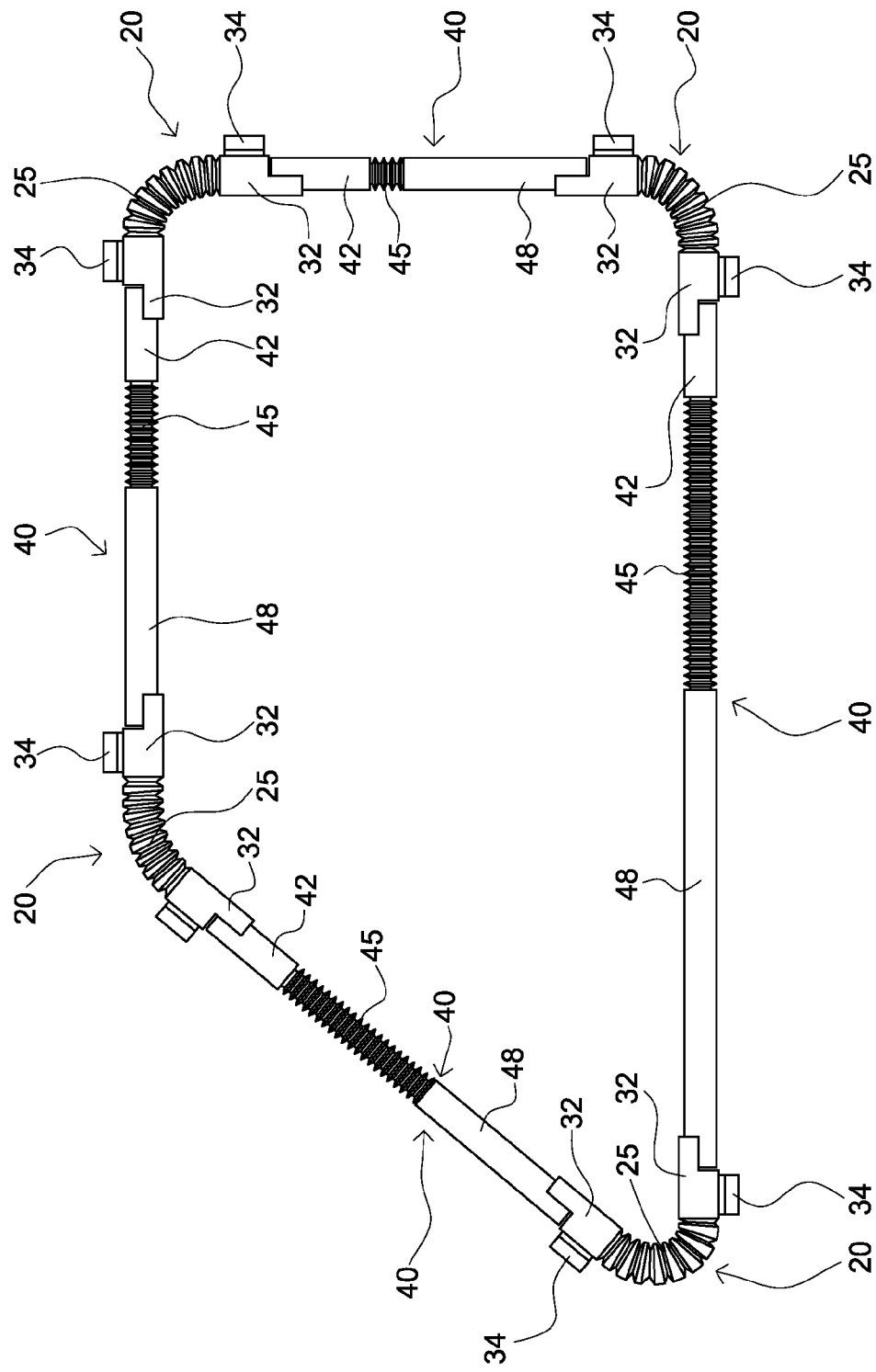
FIG. 2 is a front plan view a frame assembly of a temporary window replacement apparatus according to an embodiment.

Now referring to FIG. 2, the frame assembly of the temporary window replacement apparatus 10 according to an embodiment is illustrated. As depicted, four angled frame members 20 and four elongated frame members 40 can be used to create the frame assembly. However, any number of frame members can be assembled to create the frame assembly such as, but not limited to, three angled frame members 20 and three elongated frame members 40 to create a triangular frame assembly.

The plurality of angled frame members 20 can be seen in different angled configurations. At least one, but more typically several, of the angled frame members 20 are adapted to change angles within a plane. The plane in which the changing angles reside is generally the plane of the window (or more precisely where the window once was). Hence, the angled frame members 20 can be adjusted or adapted to fit a wide range of generally triangular, rectangular, trapezoidal, or polygon-shaped window frames because of the ability to change the angle within the plane of window to be replaces. As shown in FIG. 2, the plurality of elongated frame members 40 can be seen in various lengths. At least one, but more typically several, of the elongated frame members 40 are adapted to increase or decrease length along a longitudinal axis. This is accomplished by adjusting the amount of the first frame section (the end portion 42 and the rigid bellowed arrangement portion 45) that remains within the second frame section 48. As will be explained in more detail later in the specification, an inner cavity of the second frame section 48 comprises a rigid bellowed arrangement adapted to mate or interlock with that of the rigid bellowed arrangement portion 45 of the first frame section. Many portions of the angled frame members 20 and elongated frame members are typically, but not necessarily, cylindrical and tubular in nature. For example, portions of the angled frame members and elongated frame members in some implementations can be square or rectangular in nature.

Still referring to FIG. 2, an exemplary coupling of the angled frame members 20 and the elongated frame members 40 can be seen. The end section 32 of each of the angled frame members 20 is adapted to be removably coupled to the end portion 42 or an end of the second frame section 48 distal the first frame section of each of the elongated frame members 40. In one implementation, the end sections 32 of each of the angled frame members 20 are slightly larger in circumference than the ends of each of the elongated frame members 40. Additionally, as illustrated, the end sections 32 may be comprised of only a portion of a tubular section thereby allowing easy insertion of the end portions 42 or the ends of the second frame section 48 of each of the elongated frame members 40. Although not necessary, one end or a frame member is typically coupled to another by having slightly different end sizes that fit together relatively snuggly when the end of one frame member is placed inside the end of another. As would be obvious to one of ordinary skill in the art, other methods of removably coupling the ends of each of the angled frame members 20 to the ends of each of the elongated frame members 40 exist and are contemplated. For instance, the ends of the elongated frame members can be larger than the angled frame members thereby coupling can completed by inserting the ends of the angled frame members into the ends of the elongated frame members.

Moreover, in some embodiments of the temporary window replacement apparatus where extra support and stiffness of the frame assembly is desired, the angled frame members and elongated frame members may not be removably coupled, but rather permanently or semi-permanently connected during the construction of the frame assembly. It is contemplated that the ends of coupled frame members may actually be glued together in some fashion such as with use of rubber cement or a chemical compound/solvent adapted to fuse the ends of the frame members together. Hence, when these embodiments of the temporary window replacement apparatus are removed for installation of a permanent window, additional measures such as cutting or sawing the frame members is typically required and the temporary window replacement apparatus is not intended for reuse. Such an embodiment is generally advantageous when the temporary window needs to be secured for a significant time until a permanent replacement can be made and additional protection from the weather (e.g., wind, rain, and snow) is desired such as, for instance, replacement of a window during a time-sensitive, cross-country trucking excursion.

Figure 3A:
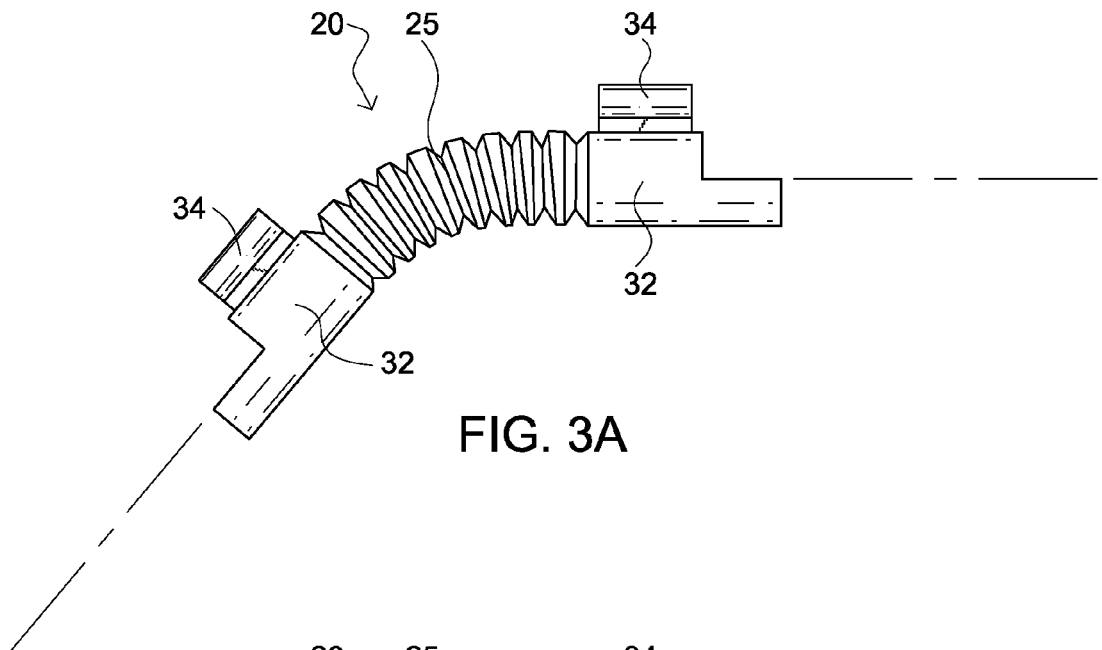
FIG. 3A is a front plan view of an angled frame member of a temporary window replacement apparatus in an obtuse angle configuration according to an embodiment.

FIG. 3A is a front plan view of an angled frame member of a temporary window replacement apparatus in an obtuse angle configuration according to an embodiment. The flexible section 25 of the angled frame members 20 is an important feature so that the angled frame member 20 can be used for replacing window of various shapes. The flexible section 25 can comprise a bellowed configuration for ease of adjustment to various angled configurations. A bellowed flexible section typically comprises a saw-tooth shape of peaks and valleys adapted to enhance flexibility and bending thereof. Advantageously, when utilizing the bellowed configuration for the flexible section 25 of the angled frame member 20, the entire angled frame member 20 can be comprised of a unibody construction with the end sections 32. Hence, a variety of techniques of injection molding for plastic, rubber, and other materials may be utilized to efficiently create the angled frame members 20. It is to be appreciated that in some implementations the bellowed flexible section is constructed to be sufficiently stiff such that it generally maintains its shape after the angled frame member 40 is adjusted to the proper corner.

Moreover, it should be understood that the flexible section need not comprise the bellowed configuration in some implementation. As opposed to the bellowed flexible section, a movable joint of two rigid sections can be utilized in variations of the angled frame member 20. Hence, the flexible section 25 may be made of two segments connected together, for example, by a rivet, screw, snap, or other fastener that allows the segments to change angles with respect to each other.

Still referring to FIG. 3A, the end sections 32 are shown connected to the flexible section 25 thereby enabling other frame members, such as the elongated frame member 40 (not shown in FIG. 3A) to couple (removably or otherwise) with the angled frame member 20. Additionally, the stability flange 34 is typically connected to at least one of the end sections 32. More commonly, the stability flange 34 is connected to two end sections 32. The stability flanges 34 are usually integrated portions of the ends, but may be constructed separately from the end sections 32 and fastened thereto at a later time. As will be described in more detail, stability flanges 34 provide an important function for securing the angled frame member 20 while in use. However, some embodiments of the angled frame member 20 may not include the security flange. Such is typically the case when a variation of the angled frame member is sized or shaped to fit snugly in a window frame or when security flanges are included in the elongated frame members.

Figure 3B:
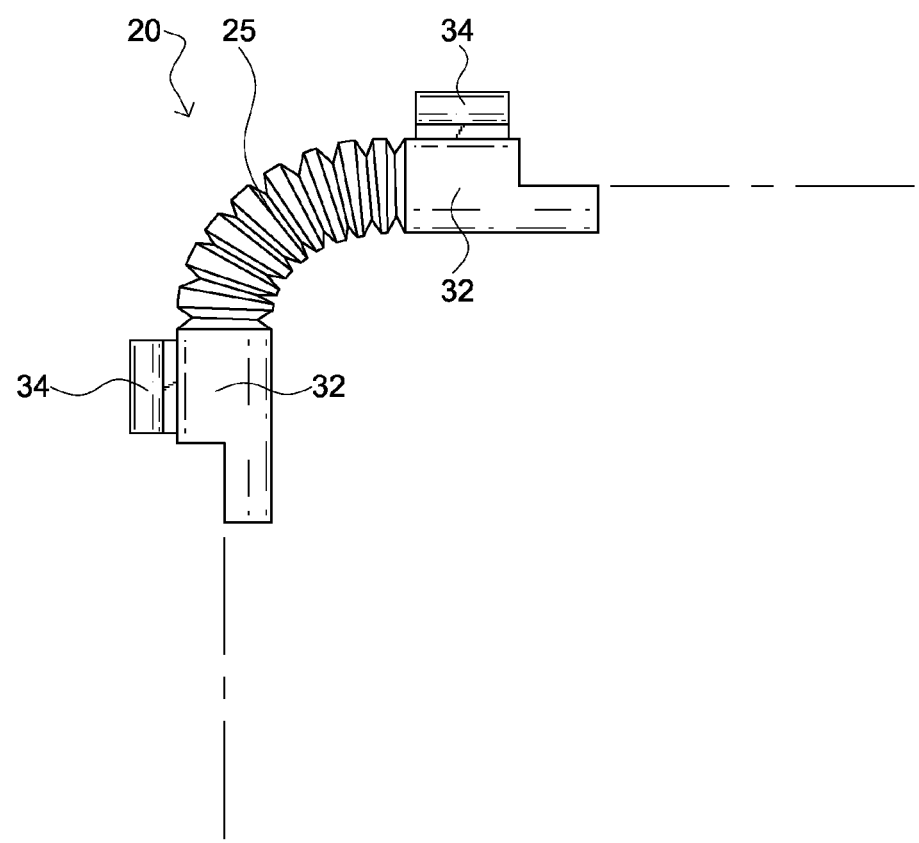
FIG. 3B is a front plan view of an angled frame member of a temporary window replacement apparatus in a 90 degree angle configuration according to an embodiment.

Now referring to FIG. 3B, a 90 degree angle configuration of the angled frame member 20 is illustrated. When the flexible section 25 is included in the angled frame member 20, changing angle configurations to fit a particular corner of a window frame is easily achieved. It is worthy to note at this point, embodiments of the angled frame member 40 may not comprise the flexible section at all. Rather, common angle configurations typically used in many temporary window replacement situations, such as the 90 degree configuration, may be embodied in angled frame members that comprise completely or substantially rigid sections which may or may not comprise a curved section as illustrated in FIG. 3B when the bellowed configuration is utilized for the flexible section 25.

Figure 4A:
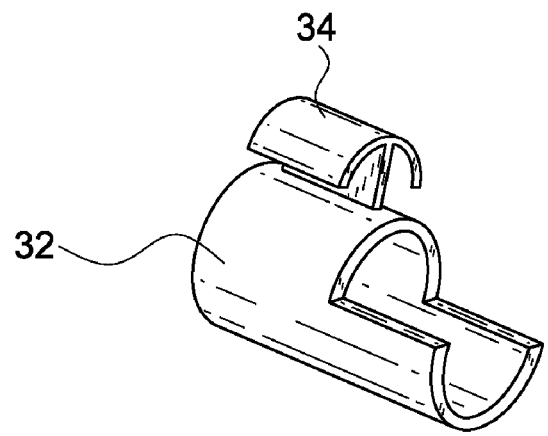
FIG. 4A is a perspective view of an end section of an angled frame member according to an embodiment.

FIG. 4A is a perspective view of an end section 32 of an angled frame member 20 according to an embodiment. As described earlier and can be seen more clearly in FIG. 4A, the end section 32 may comprise only a portion of the tubular section. Essentially, a cut-out portion is removed from an otherwise tubular portion of the end section 32. In some implementation, this end configuration enables an easier way to removably couple the various frame sections.

An exemplary embodiment of the stability flange 34 can also be seen from the perspective view of FIG. 4A. A first stability portion of the stability flange 34 is typically connected to the end section 32 and extends radially therefrom. An end of the first stability portion distal the end section 32 intersects with a second stability portion of the stability flange 34. The second stability portion can be arcuate in nature as illustrated. The first stability portion typically attached to the second stability portion at the general center of the second stability portion.

Variations of the stability flange 34 are not limited to the structure illustrated and described herein. It is to be appreciated that a variety of security flanges may be adapted for a particular implementation of the temporary window replacement apparatus. For example, a variation of the stability flange 34 may only comprise a single, yet somewhat thicker protruding section connected to the end section 32.

Figure 4B:
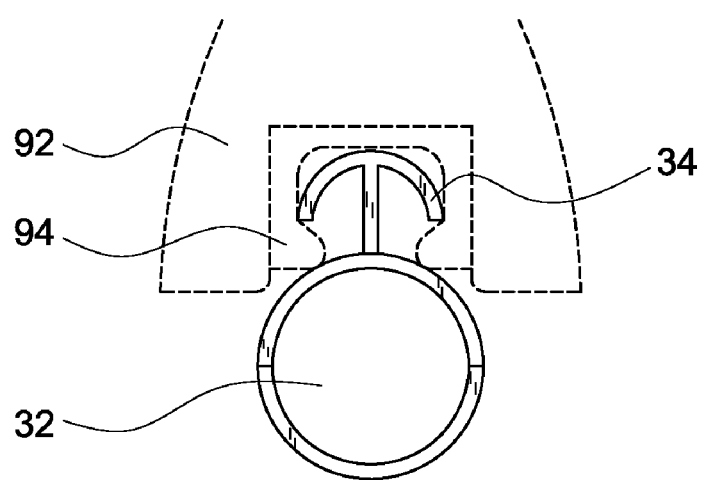
FIG. 4B is a cross-sectional view of an end section of an angled frame member coupled to a window frame according to an embodiment.

Turning now to FIG. 4B, a cross-sectional view of an end section 32 and stability flange 34 of an angled frame member 20 is illustrated coupled to a window frame. Window frame 92, such as that which may be found in an automobile side door, typically comprises a weather stripping section 94. An inner cavity typically exists in the weather stripping section 94 of the window frame 92 where an edge of a permanent window would be seated or reside when the permanent window were fully closed. The stability flange 34 can be inserted into this inner cavity of the weather stripping 94 to secure the end section 32 of the angled frame member 20 (or any other portion or section of any frame member including elongated frame members) while the frame assembly is being constructed. Importantly to some embodiments, the second stability portion of the stability flange 34 having an arcuate shape can be slightly wider while in an unbiased position than cross-section of the inner cavity the weather stripping section 94. Thus, when the second stability portion is inserted into the inner cavity, its ends will slightly contract toward the first stability portion. This operation exerts pressure to the weather stripping or walls of the inner cavity as the second stability portion attempts to expand or become unbiased while inside the inner cavity thereby enabling the angled frame member 20 (or any other frame member to which the stability flange may be attached) to be substantially secured in place. It is to be appreciated that other types of unbiasing and biasing techniques are contemplated whereby the stability flange or a portion thereof provides a frictional stabilizing pressure to an inner cavity of a frame.

Hence, embodiments of the present invention comprise a combination of a window frame and a frame member having a stability flange wherein the cross-section of the stability flange of the frame member extends further or is slightly larger when in an unbiased state than an interior cavity of the window frame. Alternatively, in other alternative embodiments, the security flange may not larger to than the inter cavity of the door frame in an unbiased state, but rather be caused to expand by pressing a button or sliding a member while the stability flange or a portion thereof is inside of the inner cavity of the door frame to create a friction stabilizing pressure. Likewise, the stability flange or similar variation thereof can also be inserted into the weather stripping flap portions of the window frame 92 that typically comprise the bottom on the window frame 92 of the automobile side door where the leading edge of the permanent window typically first protrudes when being closed after having been fully opened.

Figure 5:
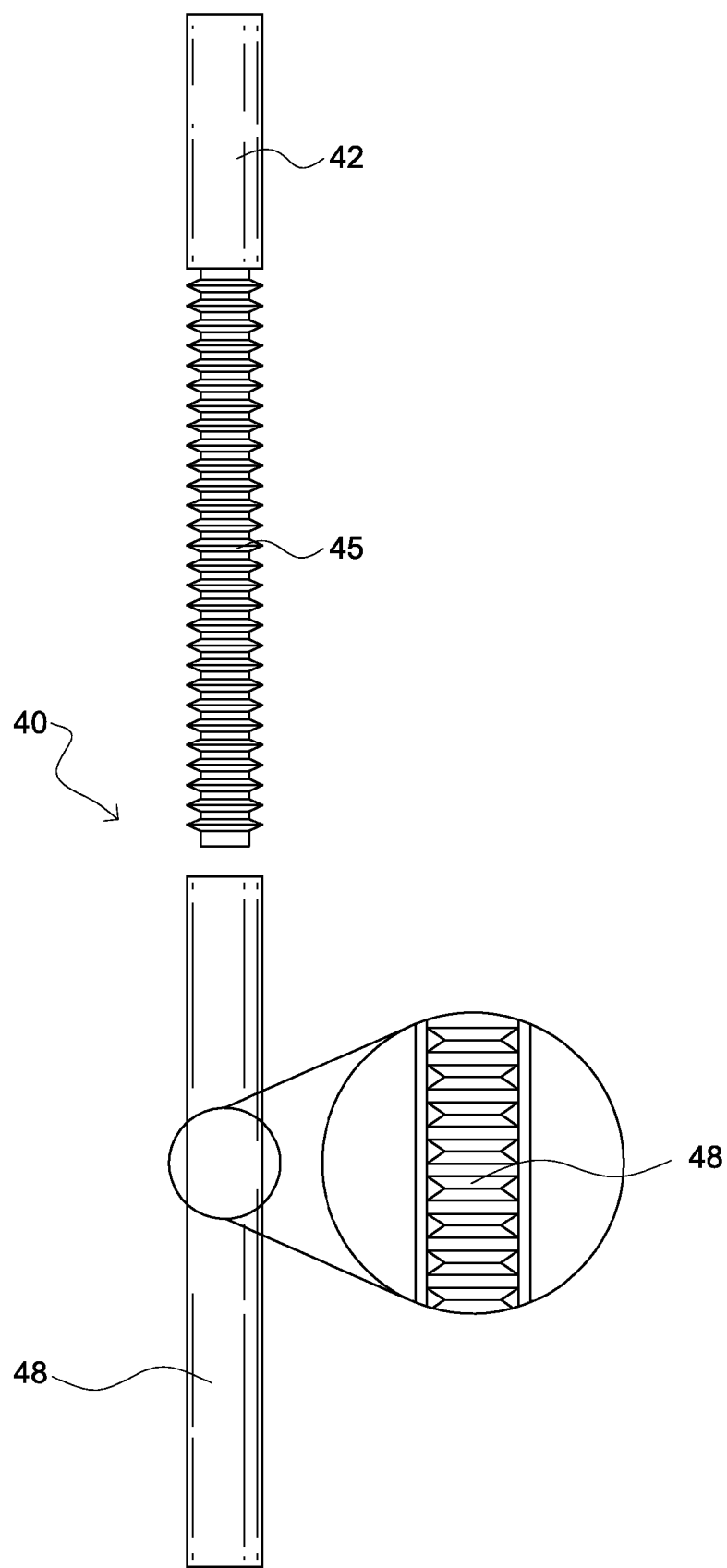
FIG. 5 is a front plan view of an elongated frame member with an exploded view of an end section thereof according to an embodiment.

FIG. 5 is a front plan view of the elongated frame member 40 with an exploded longitudinal cross-sectional view of a portion of the second frame section 48. An exemplary embodiment of the elongated frame member 40 includes the first frame section and the second frame section 48. The first frame section of the elongated frame member 40 typically includes the end portion 42 (adapted to be coupled to the end section 32 of the angled frame member) and the rigid bellowed arrangement portion 45. The rigid bellowed arrangement portion 45 enables the first frame section to be fixably movable along a generally longitudinal axis with respect to the second frame section 48.

As can best be seen from the exploded view of FIG. 5, the second frame section 48 comprises a similarly rigid bellowed configuration along an interior wall or surface thereof. Thus, when the substantially rigid bellowed arrangement portion 45 of the first frame section is inserted into an open end of the second frame section 48 the two circumferentially juxtaposed rigid bellowed arrangements mate or interlock. As a result, the elongated frame member 40 having the first frame section and the second frame section 48 coupled as such enables it to be extended and retracted to fit variously sized window frames. It is to be appreciated that different amounts of force to extend or retract the mated or interlocked first frame section and second frame section 48 of the elongated frame member 40 will typically be required given the variations and implementations of embodiments.

Moreover, the interlocking technique illustrated and described above is in no way indented to be limiting to the extending and retracting aspect of the elongated frame member 40. In fact, other embodiments of the elongated frame members are contemplated such as, but not limited to (i) telescoping tubular frame members, (ii) insertion pin/bore-type configuration frame members, and (iii) one-way only extendable frame members using inner and outer sections comprising similar locking mechanisms such as those used in one-way locking cable ties.

FIG. 6A illustrates a variation of an elongated frame member according to an embodiment. An exemplary variation of the elongated frame member 50 includes a first frame section 52 and a second frame section 58. The first frame section 52 typically includes a stability flange 54 extending substantially along the length of the first frame section 52. The second frame section 58 also typically includes a stability flange 56 extending substantially along the length of the second frame section 58. The stability flanges 54 & 56 are essentially portions of their respective frame sections extending radially from the center and longitudinally along the length of the section. Similar to the methods and variations described with respect to the stability flanges of the angled frame members, the stability flanges 54 & 56 are adapted to engage with or be inserted into various portions of weather stripping portions of a window frame including the portion comprising flaps along the bottom on the window frame of the automobile side door where the leading edge of the permanent window typically first protrudes when being closed after having been fully opened. Moreover, the stability flanges 54 & 56 extending significantly along the length of the elongated frame member 50 provide a substantially greater coupling to or seal with the window frame. Hence, when the plastic film 70 is installed with one or more elongated frame members 50, a greater weather resistant and substantially air tight seal of the temporary window replacement apparatus 10 results.

The first and second frame sections 52 & 58 are typically but not necessarily substantially rigid tubular members capable of being inserted one another. Referring now to FIG. 6B, a radial cross-sectional view where the first and second frame sections 52 & 58 overlap is illustrated. To enable the variation of the elongated frame member 50 to extend and retract, the first frame section 52 slides into the second frame section 58 in a general telescoping configuration whereby the first and second frame sections 52 & 58 and their respective stability flanges 54 & 56 will overlap along a portion of the entire length of the elongated frame member 50. Some amount of friction between an external circumferential surface of the first frame member 52 and an internal circumferential surface of the second frame member 58 enables either frame section to be fixably movable along a generally longitudinal axis of the elongated frame member 50. Similar to other variations of elongated frame members, ends of the first frame section 52 and second frame section 58 are adapted to be coupled to the end sections 32 of the angled frame members 20 (see FIGS. 3A-4B).

Now referring to FIG. 7, a perspective view of the ends of the elongated frame member 40 and the angled frame member 20 illustrates an additional coupling variation of the frame members of the temporary window replacement apparatus 10. In some variations, the end section 32 of the angled frame member 20 may include a locking bore 33. The locking bore 33 is adapted to couple to or interlock with a locking mechanism 43 on the ends of the elongated frame members 40. The end portion 42 of the first frame section is illustrated in FIG. 7 with the locking mechanism 43 to be coupled or interlocked with the locking bore 33. However, it is to be appreciated that the second frame section 48 or any other variation of the elongated frame member would have a locking mechanism 43 attached thereto. The locking mechanism 43 typically includes a movable flange section adapted to at least slightly retract when being inserted into the end section 32 until an end distal the tip of the end portion 42 reaches the locking bore 33 and springs therethrough and engages therewith.

The locking bore 33 can be a rectangular bore as shown; however, it can also be any number of bore or aperture shapes adapted to receive the locking mechanism 43, which too can be a variety shapes with various locking and springing parts. However, the locking bore 33 and locking mechanism 43 are merely exemplary of an optional way to secure the various frame members together. For instance, the locking mechanism can be a simple cutout of a portion of a frame member biased outwardly and shaped similar to the locking mechanism 43 illustrated in FIG. 7, but without any portion coupled to the frame member to extend the movable flange section. Other locking assemblies within the spirit and scope of this disclosure adapted to generate a more secure coupling or interlocking between the adjacent frame members are contemplated.

It is to be appreciated that the elements depicted in FIGS. 1-7 and variations thereof can be combined in a number of ways with a number of other elements. For example, when temporarily replacing a larger window, a connector having two, three, or four ends can be used with the elongated frame members 40. Each of the ends of the connector can be adapted to couple to the ends the elongated frame members 40 to provide a longer and sturdier frame assembly. Additionally, as discussed above, some angled frame members can have a fixed angle and some elongated frame members can have a fixed length. These fixed angle and length frame members can be adapted to couple with each other as well as the angled frame members 20 and the elongated frame members.

An Exemplary Method of Temporarily Replacing a Window

Figure 8:
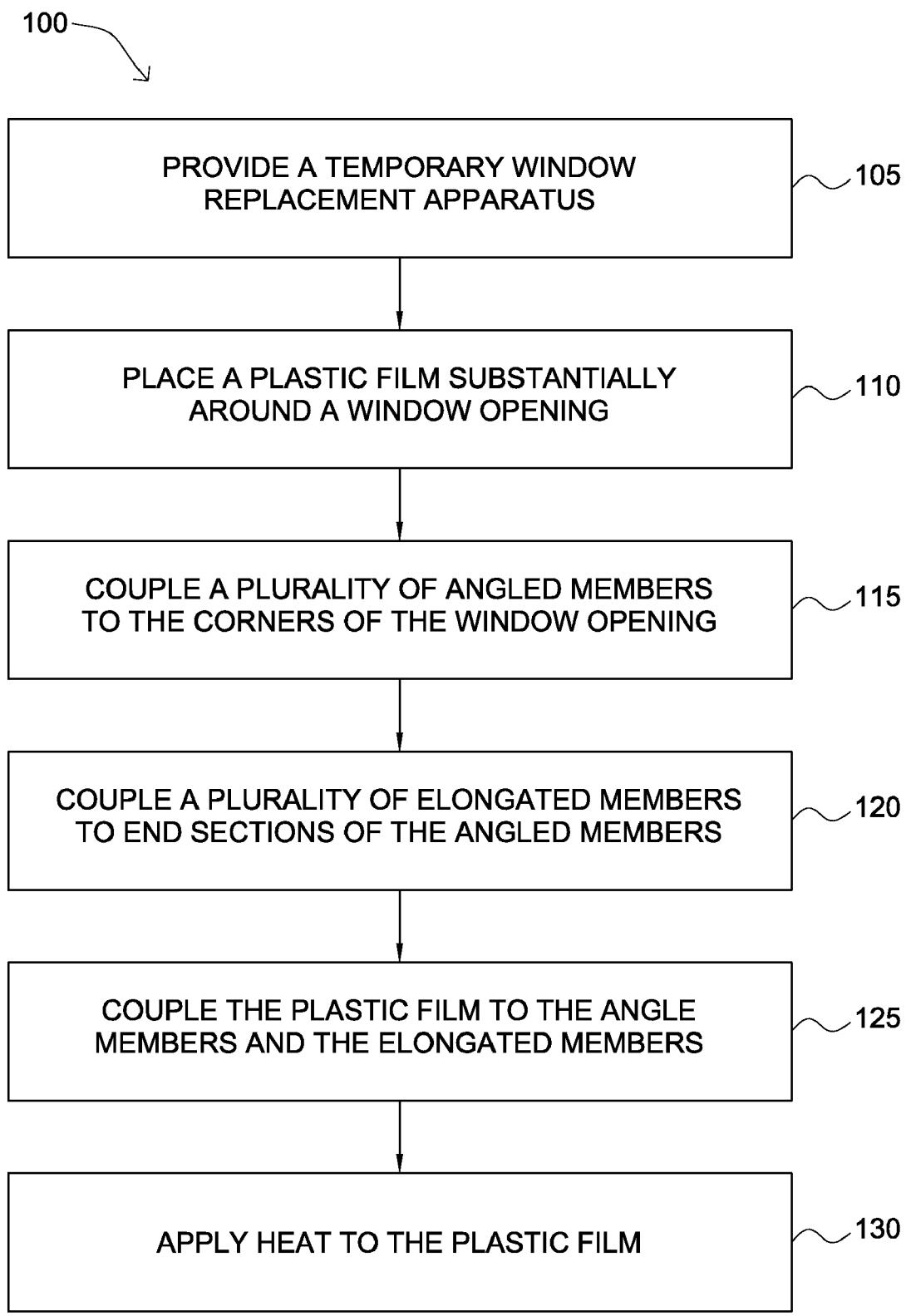
FIG. 8 is a flow chart illustrating a method of temporarily replacing a window with a temporary window replacement apparatus according to an embodiment.

FIG. 8 is a flow chart illustrating an exemplary method 100 of temporarily replacing a window with an embodiment of the temporary window replacement apparatus 10 such as the exemplary embodiment described above and illustrated in FIGS. 1-7. An operation 105 of method 100 comprises providing the temporary window replacement apparatus adapted to provide a person with good visibility for the duration for which it is installed. For example, the person, typically but not necessarily a driver, may purchase an embodiment of a temporary window replacement apparatus 10 after a window in his/her automobile has been broken. Once the temporary window replacement apparatus has been provided, the broken glass remaining within the window frame should be cleared.

Next, the plastic film is placed substantially around a window opening of the window frame (operation 110). The plastic film can be secured adjacent to or on the window frame with tape or another adhesive prior to completing the additional operations. For example, when the window frame is that of an automobile, the plastic film can be taped to the upholstery proximal the ceiling and/or the interior door panel.

As described in operation 115, each of a plurality of angled frame members is coupled proximate each corner of the window opening. This coupling is typically, but not necessarily, performed whereby the plastic film resides between the window frame and the angled frame members. Moreover, when the angled frame members comprise stability flanges and the method 100 is used to temporarily replace an automobile window, the angled frame members can be coupled by inserting the stability flanges into an inner cavity of a weather stripping section of the window opening while a portion proximal the edge do the plastic film is similarly disposed within the inner cavity.

Next, as described in operation 120, each of a plurality of elongated frame members is coupled to the plurality of angled frame members. In one embodiment, a first section of at least one elongated frame member can be extended relative to a second section thereof. Hence, each end of the at least one elongated frame member can be extended and/or retracted to couple with an end from a first angled frame member (proximal the first section of the at least one elongated frame member) and a second angled frame member (proximal the second section of the at least one elongated frame member). Similarly, the plastic film typically resides between the window frame and the elongated frame members (with or without stability flanges) thereby providing a greater weather proof and substantially air tight seal after construction of the temporary window replacement apparatus and completion of the method 100.

After a frame assembly has been created around the window opening by coupling the plurality of elongated frame members and the plurality of angled frame members together, the plastic film is coupled to the angled frame member and the elongated frame members (operation 125). Depending on the size of the window opening and the frame assembly circumferentially therearound, the plastic film may be coupled to one or several places of the angled frame member and the elongated frame members. Moreover, the plastic film typically includes one or more adhesive portions to aid in coupling it to the frame assembly. Hence, one adhesive portion can be applied to a surface of at least one elongated frame member and another adhesive portion can be applied to a surface of at least one angled frame member.

Next, as described in operation 130, heat may be applied to surface of the plastic film. Operation 130 of method 100 is performed when the plastic film is adapted to shrink upon application of heat to a surface thereof. While not necessary, many embodiments of the temporary window replacement apparatus comprise a heat-shrinkable plastic film or a plastic film with similar heat shrinking characteristics. The application of heat can be conveniently performed with a hair dryer; however, any suitable device may be utilized to apply heat to the plastic film. Applying heat evenly over the surface of the plastic film including portions around the frame assembly and within the weather stripping (if applicable) will result in a taut and securely situated temporary window covering the window opening of the window frame.

Other Embodiments and Variations

The various embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

Although application of embodiments of the temporary window replacement apparatus is generally directed to temporarily replacing windows in a vehicle, many other uses are contemplated as has been noted throughout the disclosure. For example, some embodiments of the temporary window replacement apparatus and methods of use thereof may be utilized to temporarily (or semi-permanently) replace windows in schools, office buildings, homes, and other structures.

I claim:

1. A temporary window replacement apparatus comprising:
    a plurality of angled frame members, at least one of the angled frame members adapted to change angles within a plane of a window opening;
    a plurality of elongated frame members, at least one of the elongated frame members adapted to be adjustable lengthwise along a longitudinal axis; and
    a plastic film;
    wherein (i) an end of each of the angled frame members is adapted to be removably coupled to an end of each of the elongated frame members, (ii) at least one angled frame member includes a flexible section and at least two end sections, and (iii) the flexible section of the at least one angled frame member comprises a bellowed configuration.

2. The temporary window replacement apparatus of claim 1, wherein at least one angled frame member includes a stability flange thereon.

3. The temporary window replacement apparatus of claim 1, wherein at least one elongated frame member includes a stability flange thereon.

4. The temporary window replacement apparatus of claim 1, wherein at least one elongated frame member includes a first frame section and a second frame section, the first frame section being fixably movable along a generally longitudinal axis with respect to the second frame section.

5. The temporary window replacement apparatus of claim 4, wherein the first frame section and the second frame section are arranged in a general telescoping configuration.

6. The temporary window replacement apparatus of claim 1, wherein the plastic film includes one or more adhesive portions adapted to be coupled to the angled frame members and the elongated frame members.

7. The temporary window replacement apparatus of claim 1, wherein the plastic film is adapted to shrink upon application of heat to a surface thereof.

8. The temporary window replacement apparatus of claim 1, wherein the plastic film is tinted.

9. A method of using the temporary window replacement apparatus of claim 1, the method comprising:
    placing the plastic film substantially around a window opening;
    coupling the plurality of angled frame members proximate each corner of the window opening;
    coupling the plurality of elongated frame members to the plurality of angled frame members; and
    coupling a one adhesive portion of the one or more adhesive portions of the plastic film to a surface of at least one of the plurality of elongated frame members.

10. The method of claim 9, the method further comprising, coupling another adhesive portion of the one or more adhesive portions of the plastic film to a surface of at least one of the plurality of angled frame members.

11. The method of claim 9 wherein the plastic film is adapted to shrink upon application of heat to a surface thereof, the method further comprising,
    applying heat to the surface of the plastic film.

12. A temporary window replacement apparatus comprising:
    a plurality of angled frame members, at least one of the angled frame members adapted to change angles within a plane of a window opening;
    a plurality of elongated frame members, at least one of the elongated frame members adapted to be adjustable lengthwise along a longitudinal axis; and
    a plastic film;
    wherein (i) an end of each of the angled frame members is adapted to be removably coupled to an end of each of the elongated frame members, and (ii) at least one elongated frame member includes a first frame section and a second frame section, the first frame section being fixably movable along a generally longitudinal axis with respect to the second frame section, and (iii) the first frame section includes a substantially rigid bellowed arrangement portion adapted to interlock with the second frame section.

13. The temporary window replacement apparatus of claim 12, wherein at least one angled frame member includes a stability flange thereon.

14. The temporary window replacement apparatus of claim 12, wherein at least one elongated frame member includes a stability flange thereon.

15. The temporary window replacement apparatus of claim 12, wherein at least one elongated frame member includes a first frame section and a second frame section, the first frame section being fixably movable along a generally longitudinal axis with respect to the second frame section.

16. The temporary window replacement apparatus of claim 15, wherein the first frame section and the second frame section are arranged in a general telescoping configuration.

17. The temporary window replacement apparatus of claim 12, wherein the plastic film includes one or more adhesive portions adapted to be coupled to the angled frame members and the elongated frame members.

18. The temporary window replacement apparatus of claim 12, wherein the plastic film is adapted to shrink upon application of heat to a surface thereof.

19. A method of using the temporary window replacement apparatus of claim 12, the method comprising:
    placing the plastic film substantially around a window opening;
    coupling the plurality of angled frame members proximate each corner of the window opening;
    coupling the plurality of elongated frame members to the plurality of angled frame members; and
    coupling a one adhesive portion of the one or more adhesive portions of the plastic film to a surface of at least one of the plurality of elongated frame members.

20. The method of claim 19, the method further comprising,
    coupling another adhesive portion of the one or more adhesive portions of the plastic film to a surface of at least one of the plurality of angled frame members.

* * * * *